United States Patent [19]
Krasinski et al.

[11] Patent Number: 5,142,548
[45] Date of Patent: Aug. 25, 1992

[54] BROADBAND TUNING AND LASER LINE NARROWING UTILIZING BIREFRINGENT LASER HOSTS

[75] Inventors: Jerzy S. Krasinski, Blairstown; Paul A. Papanestor, Maplewood; Yehuda B. Band, Elizabeth; Donald F. Heller, Bound Brook; Robert C. Morris, Ledgewood; Timothy C. K. Chin, Lebanon, all of N.J.

[73] Assignee: Allied-Signal Inc., Morris Township, Morris County, N.J.

[21] Appl. No.: 509,392

[22] Filed: Apr. 13, 1990

[51] Int. Cl.$^5$ ............................................. H01S 3/08
[52] U.S. Cl. ................................. 372/105; 372/20; 372/106
[58] Field of Search ............... 372/20, 41, 105, 106, 372/9

[56] References Cited

U.S. PATENT DOCUMENTS

| | | | |
|---|---|---|---|
| 3,780,296 | 12/1973 | Waksberg et al. | 372/31 |
| 3,934,210 | 1/1976 | Yarborough et al. | 372/105 |
| 3,983,507 | 9/1976 | Tang et al. | 372/105 |
| 4,233,569 | 11/1980 | Liu | 372/20 |
| 4,408,334 | 10/1983 | Lundstrom | 372/105 |
| 4,500,178 | 2/1985 | Yeh | 350/400 |
| 4,894,831 | 1/1990 | Alfrey | 372/19 |
| 4,935,932 | 6/1990 | Johnson et al. | 372/105 |

Primary Examiner—Georgia Y. Epps
Attorney, Agent, or Firm—Gerhard H. Fuchs; Richard C. Stewart

[57] ABSTRACT

Rotational displacement of the birefringent lasing medium in a lasing cavity containing a polarizing element varies the spectral width of the generated laser light. The combination in a lasing cavity of a birefringent lasing medium, a polarizing element, a tuning element and a birefringent compensator permits output of narrow bandwidth spectrally tuned laser light continuously over the total gain bandwidth of the lasing medium by rotating the lasing medium, tuning to desired wavelength, and adjusting the birefringent compensator to optimize output of laser light.

19 Claims, 3 Drawing Sheets

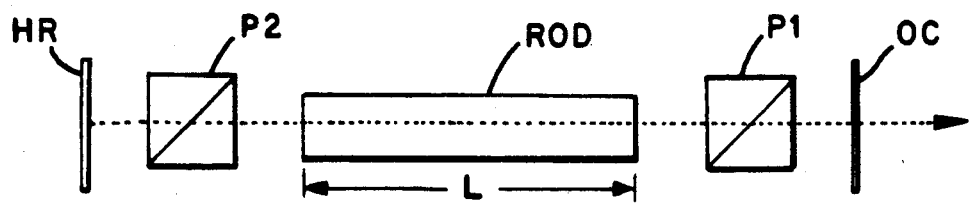
F I G. 1a
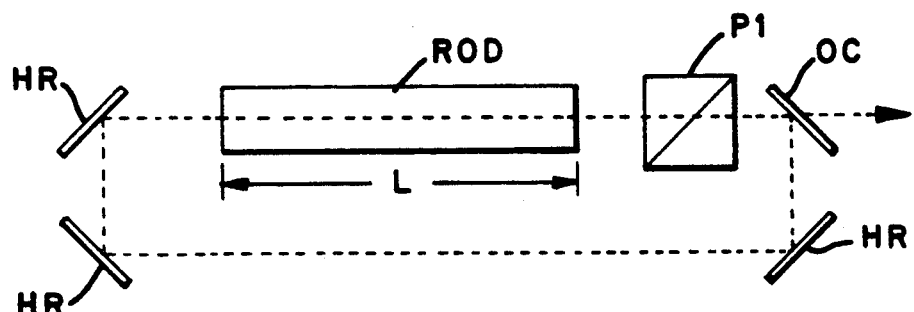
F I G. 1b
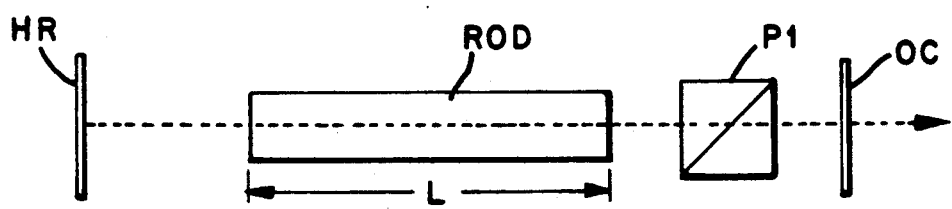
F I G. 1c
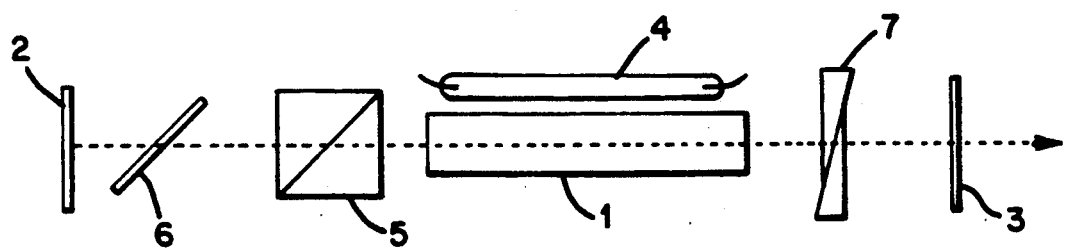
F I G. 5

0.77 nm

BROADBAND TUNING AND LASER LINE NARROWING UTILIZING BIREFRINGENT LASER HOSTS

FIELD OF THE INVENTION

This invention relates to the field of solid state lasers utilizing birefringent, broadband gain laser hosts. It has as one of its objectives the provision of means for line-narrowing the laser output; it has as another object the prosivsion of means for continuous tuning of such line-narrowed output.

SUMMARY OF THE INVENTION

In a first aspect, the present invention provides a solid state laser comprising (a) a birefringent, broadband gain laser medium having a longitudinal axis along which, in operation, a beam of coherent light is propagated, which laser medium is mounted for rotation about its longitudinal axis; (b) means for exciting the laser medium to act as a light amplifier; (c) reflecting means associated with the laser medium defining a resonant laser cavity for supporting coherent oscillation within the laser medium; and (d) at least one polarizing element located within the laser cavity, whereby, in lasing, rotation of the laser medium about its longitudinal axis varies the spectral width of the generated laser light.

The apparatus may further include an optional tuning element located within the laser cavity, to permit discontinuous tuning, as to be described in more detail, below.

The above-described apparatus permits control of the spectral width of the generated laser beam, but it does not permit continuous tuning over the whole tunable range of the lasing medium. However, by further providing the lasing cavity of the above-described apparatus with a birefringent compensator together with a tuning element, the apparatus will be capable of generating line narrowed laser output over the whole tunable wavelength range capability of the laser medium. Accordingly, the present invention further provides the above-described apparatus additionally including a birefringent compensator together with a tuning element within the laser cavity.

The invention further provides—in a solid state laser having a birefringent, broadband gain laser medium which is rotatably mounted about its longitudinal axis along with a beam of coherent radiation is propagated, together with a polarizing element located within the laser cavity—the method of varying the spectral bandwidth of the laser radiation by rotating the laser medium about its longitudinal axis.

Lastly, the invention provides—in a wavelength tunable solid state laser having a birefringent, broadband gain laser medium which is rotatably mounted about its longitudinal axis along which a beam of coherent radiation is propagated, together with at least one each of polarizing and tuning elements together with a birefringent compensator located within the laser cavity—the method of generating continuously tunable, spectrally narrowed laser radiation by rotating the laser medium about its longitudinal axis, and operating the tuning element, to obtain spectrally narrowed laser radiation in the desired wavelength within the gain bandwidth of the laser medium.

For purposes of the present invention, a "broadband gain laser medium" is a laser medium which is tunable over a bandwidth of at least about 5 A.

BRIEF DESCRIPTION OF THE DRAWINGS

The present invention may be better understood with reference to the annexed drawings, wherein:

FIGS. 1(a)-1(c) illustrates laser cavity configurations in accordance with the present invention containing polarizing elements and a birefringent rod, and specifically (a) a standing wave cavity in which the rod is sandwiched between two polarizers.; (b) a ring laser cavity; and (c) a standing wave cavity with a single polarizing element.

FIG. 5 illustrates a laser apparatus in accordance with the invention including the rotatably mounted laser rod, the polarizing element, together with a tuning element and a birefringent compensator.

Figure 2:
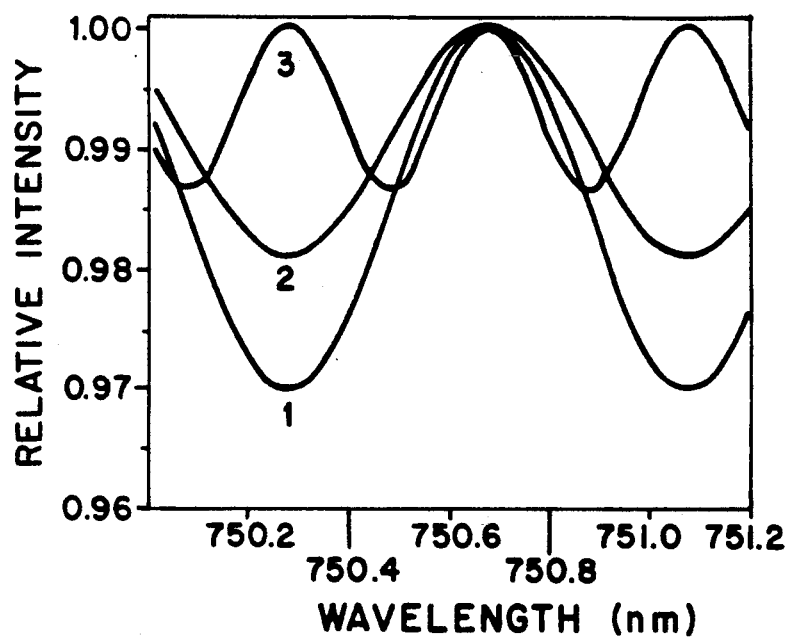
FIG. 2 shows a computed relative intensity for polarized light incident on an alexandrite rod-polarizer system for misalignment angle $\alpha=5°$. Rod length L equals 128.8 mm. Curve 1 is for $g_a=g_b=1$; curve 2 is for $g_a=1.18$, $g_b=3$; and curve 3 is for a rod-rod-polarizer system with $g_a=1.39$, $g_b=9$, all as described in more detail in the following specification.

DETAILED DESCRIPTION OF THE INVENTION, OF THE PREFERRED EMBODIMENTS, AND OF THE BEST MODE PRESENTLY CONTEMPLATED FOR ITS PRACTICE

We have studied the effects of the birefringence of gain media on laser spectral output, and found that the natural birefringence of optically anisotropic solid-state laser media can be exploited, in conjunction with other intracavity polarization elements, to provide substantial spectral narrowing of the laser output. For lasers employing birefringent media having broadband gain, the technique here disclosed can be used to provide continuously tunable, spectrally narrow output across the gain bandwidth. The technique requires only coarse band intracavity tuning elements, as the laser medium itself serves as a very thick birefringent tuning element. If the polarization axis of the medium is only slightly misaligned with respect to intracavity polarizing elements, a periodic modulation of the output power with frequency is obtained when the coarse bandpass intracavity birefringent tuner is scanned. For large misalignment, or near threshold operation, the laser generates narrow bandwidth output (a few axial mode laser operation), but the laser frequency hops during tuning. Narrow bandwidth operation with continuous tunability can be obtained by introducing a birefringent compensator. Our analysis of these effects is presented below. We have obtained good agreement between experimental and theoretical results.

Most lasers incorporate intracavity polarization sensitive elements, e.g. Brewster plates, birefringent tuners [see, e.g., B. Lyot, Compt. Rend. 197, 1593-1595 (1933); A. L. Bloom, J. Opt. Soc. Amer. 64, 447-452 (1974); and G. Holtom and O. Teschke, IEEE J. Quant. Electron. QE-10, 577-579 (1974)], windows, and the like. Generally, a light beam propagating in a birefringent material splits into two orthogonally polarized components (ordinary and extraordinary) that propagate with different velocities and different ray paths. The intensities of the components depend on the mismatch angle between the polarization axis of the cavity and the crystal axis, and on the gain and loss for each component. For rays propagating parallel to the z axis, the velocities of the two rays are determined by $n_x$ and $n_y$. When the electric vector lies off axis in the x-y plane, there is a relative phase shift between the ordinary and extraordinary ray components, $\Delta\phi = 2\pi |n_x - n_y| l/\lambda$ (l is the total path length of the light in the birefringent material before entering the polarizer, and $\lambda$ is the wavelength) and the exit beam is elliptically polarized. The electric field components can be written as $$E_x = E_0 g_x^{1/2} \cos\alpha \cos(\omega t + \Delta_x), \qquad (1)$$

$$E_y = E_0 g_y^{1/2} \sin\alpha \cos(\omega t + \Delta_y), \qquad (2)$$

where $\omega = c/\lambda$ is the frequency of the wave, $\alpha$ is the angle between the x axis and the axis of the polarizer, $g_x$ and $g_y$ are the intensity amplification factors ("gain" from polarizer to polarizer) for polarization along the x and y axes, respectively, and the phase shifts are $\Delta_x = -2\pi n_x l/\lambda$, and $\Delta_y = -2\pi n_y l/\lambda$. Given the dispersion of the birefringence, one can easily find the state of the light polarization at the exit plane of the birefringent medium.

For a polarized beam with electric field $E_0$ incident on an optical system consisting of a birefringent gain medium and a polarizer (with axis parallel to $E_0$), the output electric field is given by:

$$E_{out} = E_0 [g_x^{1/2} \cos^2\alpha \cos(\omega t + \Delta_x) + g_y^{1/2} \sin^2\alpha \cos(\omega t + \Delta_y)]. \qquad (3)$$

The time averaged output intensity is $$I_{out} = E_0^2/2 \{[g_x^{1/2} \cos^2\alpha + g_y^{1/2} \sin^2\alpha \cos(\Delta_y - \Delta_x)]^2 + [g_y^{1/2} \sin^2\alpha \sin(\Delta_y - \Delta_x)]^2\}. \qquad (4)$$

The maximum transmission intensity of this system equals $E_0^2/2[g_x^{1/2} \cos^2\alpha + g_y^{1/2} \sin^2\alpha]^2$ at wavelengths such that $\Delta\phi = 2m\pi$, where m is an integer. A minimum transmission of $E_0^2/2[g_x^{1/2} \cos^2\alpha - g_y^{1/2} \sin^2\alpha]^2$ occurs for wavelengths such that $\Delta\phi = (2m+1)\pi$. The maximum modulation depth is obtained when $\alpha = \pi/4$. For $g_x = g_y = 1$, the solution for the intensity (Eq. 4) corresponds to the standard Lyot filter solution.[1-3] Clearly, from Eq. (4), the transmitted intensity, $I_{out}$ is periodic in wavelength with the free spectral range is given by $$\Delta\lambda = \lambda^2/(|n_x - n_y| l), \qquad (5)$$

where l is the total path length of the light in the birefringent material before entering the polarizer. In a standing wave cavity laser containing a birefrigent gain medium of length L and a single polarizing element (see FIG. 1c) l=2L, since the light passes through the gain medium twice before entering the polarizer. For a ring laser as shown in FIG. 1b, or for a standing wave cavity configuration in which the laser medium is sandwiched between two polarizers as shown in FIG. 1a, the light beam passes only once through the gain medium before entering a polarizer. Thus, l=L, and the free spectral range is twice that of a standing wave cavity containing one polarizer. In all cases, the free spectral range decreases with increasing birefringence and with propagation length.

If continuous tunability without modulation of the intensity as a function of frequency is desired, very careful alignment of the gain medium at $\alpha = 0$ in order to maintain the polarization of the incident beam is necessary. Alternatively, one can intentionally misalign the rod at $\alpha \approx \pi/4$ and utilize the resulting selectivity to obtain narrow bandwidth from the laser. This will result in laser ouput in a narrow range of wavelengths near the maxima of the function given in Eq. (4). However, continuous tunability can be achieved by insertion of an adjustable intracavity birefringent compensator (see below).

Figure 3:
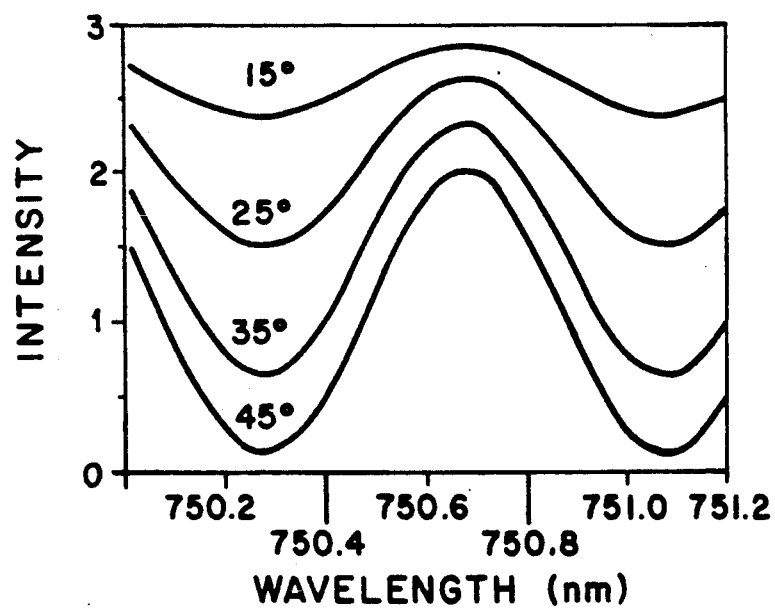
FIG. 3 illustrates the wavelength dependence of amplification for $g_a=1.18$, $g_b=3$ and various misalignment angles, $\alpha=15°, 25°, 35°, 45°$, where the rod length L equals 128.8 mm.

For a c-axis cut alexandrite laser rod [$Cr^{3+}$:$BeAl_2O_4$ with optical principal axes (x,y,z) coinciding with the crystallographic axes (c,a,b) respectively and propagation along the optical x axis], the free spectral range is given by Eq. (5) with $n_x$ and $n_y$ replaced by $n_a$ and $n_b$ respectively. FIG. 2 shows computed relative intensities (relative to the maximum intensities) using the experimentally determined indices of refraction of alexandrite[4], for a misalignment angle $\alpha = 5°$ between the b-axis of the laser rod and the polarizer axis for a rod of length 128.8 mm. Curve 1 is for $g_a = g_b = 1$ (passive case) and the rod sandwiched between polarizers as shown in FIG. 1a. Curve 2 is for $g_b = 3$, $g_a = 1.18$ (single pass gains typical for alexandrite) and the rod sandwiched between polarizers as shown in FIG. 1a. Curve 3 is for $g_b = 9$, $g_a = 1.39$ (double pass gain) and one intracavity polarizer as shown in FIG. 1c. The intracavity loss is modulated by about 3% as a function of frequency for curve 1, 1.9% for curve 2, and 1.3% for curve 3. The losses in curves 2 and 3 are sufficient to severely modulate laser output. FIG. 3 shows the gain as a function of wavelength for $g_b = 3$, $g_a = 1.18$ and the rod sandwiched between polarizers for $\alpha = 5, 15, 25$ and $45°$. The modulation (and selectivity) increases with mismatch angle and reaches a maximum at 45° while the gain at transmission maximum decreases with angle and reaches a minimum of about 70% of $g_b$ at 45°. The decrease of the intensity at the transmission maximum with increasing mismatch angle $\alpha$ results from the fact that $g_a \neq g_b$. Note that an anisotropic gain medium does not act as a polarizer since it does not reject components polarized perpendicular to the high gain axis.

Figure 4A:
FIGS. 4(a)-4(c) shows (a) transmission of a five element tuner (quartz plate thickness ratios 1:2:2:5:5 where 1 equals 0.513 mm); (b) transmission spectrum of an unpumped polarizer-alexandrite rod-polarizer configuration; (c) output spectrum of an alexandrite laser containing the rod sandwiched between two polarizers (same rod as in FIG. 3, $\alpha=\pi/4$).
Figure 4B:
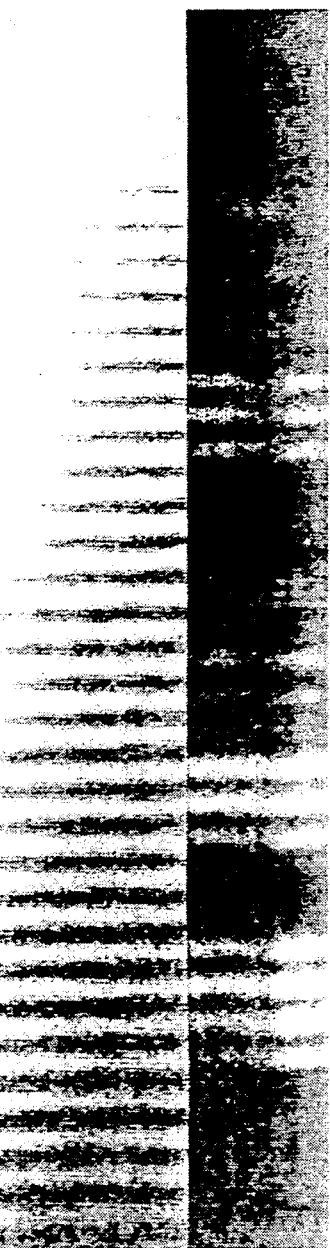
Figure 4C:

FIG. 4a shows the transmission spectrum of a typical five element birefrigent tuner. FIG. 4b shows the transmission spectrum of an unpumped polarizer-alexandrite rod-polarizer system. The b axis of the alexandrite crystal in FIG. 4b was intentionally misaligned by $\alpha = \pi/4$ which corresponds to maximum contrast of the transmission curve. FIG. 4c shows the spectrum of a pulsed alexandrite laser containing the same rod sandwiched between two polarizes, as in FIG. 1a, but also containing a very low dispersion glass prism. The prism permitted lasing over a large bandwidth. In the lasing experiment, FIG. 4c, the rod was misaligned by only a few degrees. Clearly, there is a very good correspondence between the transmission peaks of the passive system and the lasing wavelengths. The transmission period is about 0.77 nm, in agreement with Eq. (5). The resolution in FIGS. 4a–c is instrumentally limited to ~0.3 nm. The selectivity of the tuner (FIG. 4a) is much less than that of the alexandrite rod (FIG. 4b).

Without introduction of additional intracavity elements, the output is narrow-band and tunable only in discrete jumps of a few angstroms, corresponding to the free spectral range of the rod-tuner. This we demonstrated by tuning with a five element birefringent tuner and utilizing the birefringence of the rod at an angle of $\pi/4$ between the polarizer axis and the b-axis of the crystal. The output wavelength hopped by increments equal to that obtained in Eq. (5). The output power was periodically modulated as a function of wavelength with maxima (minima) at wavelengths corresponding to the maximum (minimum) of the product of the transmissions of the tuner and polarizer-rod-polarizer system. Inserting an adjustable birefringent compensator permits the laser to be tuned continuously (simultaneously adjusting the birefringent tuner for maximum power). The resolved spectrum of the laser output consisted of two adjacent cavity modes. At higher pumping levels, more modes were observed. The spectral narrowing is obtained without insertion of any additional intracavity elements. The only "price" for the spectral narrowing is some gain reduction when $g_a \neq g_b$. A mechanically tunable compensator of Soleil-Babinet type is suitable for tuning, but an electro-optical modulator offers the advantages of electronic control.

To obtain the benefit of line narrowing while maintaining continuous tunability over the full gain band of the laser medium, the apparatus of the present invention, as illustrated in FIG. 5, includes the rotatably mounted birefrigent, broadband gain laser medium 1; full reflector 2 and partial reflector (output coupler) 3, which together define the lasing cavity; pump source 4; polarizing element 5; tuning element 6; and birefrigent compensator 7. The means by which angular displacement (rotation about its longitudinal axis) of the laser rod is accomplished is not a critical aspect, so long as the means are capable of permitting rotation of the rod, and holding of the rod in its rotated position while the laser is in operation. Any suitable mechanical clamping means or journaling means will suffice. Desirably, the principle optical axis of the laser medium is rotated with respect to the axis of alignment of the polarizing element at an angle of at least about 5°.

In summary, for tunable birefringent solid-state lasers, we have shown that the birefringence of the active medium can be used for spectral narrowing of the laser output. The polarizing element together with the laser rod form a birefringent Lyot type filter[1-3] whose gain is polarization dependent. An inadvertent few degree misalignment is sufficient to cause significant modulation of laser output power with wavelength. For alexandrite rods, a free spectral range of a few angstroms for a typical length rod (~10 cm) can be obtained. We have exploited these effects to produce narrow-band tunable output from an alexandrite laser. This method of obtaining narrow-band output is easy to implement since it does not require insertion of additional intracavity elements. High selectivity is obtained since the rod behaves as a very thick birefringent filter and therefore a very narrow laser bandwidth is obtained without intracavity etalons. Continuously tunable narrow-band output is obtained with introduction of a birefringent compensator.

The present invention advantageously utilizes any birefringent, broadband gain laser medium. As stated, above, for purposes of the present invention, a "broadband gain laser medium" is a laser medium which is tunable over a bandwidth of at least about 5 A. Specific examples of preferred embodiments include alexandrite, Ti-sapphire, and members selected from the group consisting of $RE:La_2Be_2O_5$, $RE:YAlO_3$, $RE:YLiF_4$ and $RE:BaY_2F_8$ wherein RE is selected from the group consisting of Nd, Ho, Er, Tm and mixtures thereof. More preferred are alexandrite, Ti-sapphire and $Nd:La_2Be_2O_5$ (also known as Nd:BEL), with alexandrite being most preferred.

Specific examples of tuning elements include prisms, optical gratings, birefringent plates, Lyot filters and single or multiple etalons. Specific examples of polarizing elements include prism and thin film polarizers.

Other than expressly otherwise described above, the laser apparatus of the present invention is operated in conventional manner. It can utilize conventional pump sources, cooling and control means, if desired, as well as beam delivery means. The apparatus is particularly suited for application where narrow band width laser beams are advantageously employed, particularly in applications such as holography, optical lidar, and isotope separation.

Since various changes and modifications may be made in the present invention without departing from its spirit and essential characteristics, it is intended that all matter contained in the description shall be interpreted as illustrative only and not in a limiting sense, the scope of the invention being defined by the appended claims.

We claim:
1. A solid laser comprising, in combination,
    (a) a birefringent, broadband gain laser medium having a longitudinal axis along which, in operation, a beam of coherent light is propagated, which laser medium is mounted for rotation about its longitudinal axis;
    (b) means for exciting said laser medium to act as a light amplifier;
    (c) reflecting means associated with said laser medium defining a resonant laser cavity for supporting coherent oscillation within said laser medium;
    (d) a polarizing element located within said laser cavity whereby, in lasing, rotation of said laser medium about its longitudinal axis varies the spectral width of the generated laser light; and
    (e) an adjustable birefringent compensator.
2. The laser of claim 1 wherein the laser medium is selected from the group consisting of alexandrite, Ti-sapphire, and members selected from the group consisting of $RE:La_2Be_2O_5$, $RE:YAlO_3$, $RE:YLiF_4$ and $RE:BaY_2F_8$ wherein RE is selected from the group consisting of Nd, Ho, Er, Tm and mixtures thereof.
3. The laser of claim 1 wherein the laser medium is selected from the group consisting of alexandrite, Ti-sapphire and Nd:BEL.
4. The laser of claim 1 wherein the principle optical axis of the laser medium is rotated with respect to the axis of alignment of the polarizing element at an angle of at least about 5°.
5. The laser of claim 4 wherein the laser medium is selected from the group consisting of alexandrite, Ti-sapphire, and members selected from the group consisting of $RE:La_2Be_2O_5$, $RE:YAlO_3$, $RE:YLiF_4$ and $RE:BaY_2F_8$ wherein RE is selected from the group consisting of Nd, Ho, Er, Tm and mixtures thereof.

6. The laser of claim 5 wherein the laser medium is selected from the group consisting of alexandrite, Ti-sapphire and Nd:BEL.

7. A wavelength tunable solid state laser according to claim 1 further comprising a tuning element.

8. The wavelength tunable solid state laser of claim 7 wherein the principle optical axis of the laser medium is rotated with respect to the axis of alignment of the polarizing element at an angle of at least about 5°.

9. The wavelength tunable solid state laser according to claim 8 the laser medium is selected from the group consisting of alexandrite, Ti-sapphire, and members selected from the group consisting of $RE:La_2Be_2O_5$, $RE:YAlO_3$, $RE:YLiF_4$ and $RE:BaY_2F_8$ wherein RE is selected from the group consisting of Nd, Ho, Er, Tm and mixtures thereof.

10. The wavelength tunable solid state laser of claim 9 wherein the laser medium is selected from the group consisting of alexandrite, Ti-sapphire and Nd:BEL.

11. The wavelength tunable solid state laser according to claim 10 wherein the laser medium is alexandrite.

12. In a wavelength tunable solid state laser having a birefringent, broadband gain laser medium which is rotatably mounted about its longitudinal axis along which a beam of coherent radiation is propagated, together with an adjustable birefringent compensator and at least one each of polarizing and tuning elements located within the laser cavity, the method of varying the spectral band width of the laser radiation by rotating the laser medium about its longitudinal axis.

13. The method of claim 12 wherein the laser medium is selected from the group consisting of alexandrite, Ti-sapphire, and members selected from the group consisting of $RE:La_2Be_2O_5$, $RE:YAlO_3$, $RE:YLiF_4$ and $RE:BaY_2F_8$ wherein RE is selected from the group consisting of Nd, Ho, Er, Tm and mixtures thereof.

14. The method of claim 13 wherein the laser medium is selected from the group consisting of alexandrite, Ti-sapphire and Nd:BEL.

15. The method of claim 14, wherein the laser medium is alexandrite.

16. In a wavelength tunable solid state laser having a birefringent, broadband gain laser medium which is rotatably mounted about its longitudinal axis along which a beam of coherent radiation is propagated, together with an adjustable birefringent compensator and at least one each of polarizing and tuning elements located within the laser cavity, the method of generating continuously tunable, spectrally narrowed laser radiation which comprises rotating the laser medium about its longitudinal axis to obtain desired degree of spectral narrowing, operating the tuning element and adjusting the birefringent compensator to obtain spectrally narrowed laser radiation in the desired wavelength within the gain bandwidth of the laser medium.

17. The method of claim 16, wherein the laser medium is selected from the group consisting of alexandrite, Ti-sapphire, and members selected from the group consisting of $RE:La_2Be_2O_5$, $RE:YAlO_3$, $RE:YLiF_4$ and $RE:BaY_2F_8$ wherein RE is selected from the group consisting of Nd, Ho, Er, Tm and mixtures thereof.

18. The method of claim 17 wherein the laser medium is selected from the group consisting of alexandrite, Ti-sapphire and Nd:BEL.

19. The method of claim 18 wherein the laser medium is alexandrite.

* * * * *